US006412203B1

(12) United States Patent
Libhart et al.

(10) Patent No.: US 6,412,203 B1
(45) Date of Patent: Jul. 2, 2002

(54) ELEVATABLE SIGNBOARD SYSTEM FOR HIGHWAY VEHICLES

(75) Inventors: Anthony C. Libhart, Huntsville; Leon R. Drake, Gurley, both of AL (US)

(73) Assignee: Schwarze Industries, Inc., Huntsville, AL (US)

( * ) Notice: Subject to any disclaimer, the term of this patent is extended or adjusted under 35 U.S.C. 154(b) by 0 days.

(21) Appl. No.: 09/546,167

(22) Filed: Apr. 11, 2000

(51) Int. Cl.[7] .................... G09F 21/04; B60Q 7/00

(52) U.S. Cl. .................... 40/591; 40/601; 340/472

(58) Field of Search .................... 40/588, 589, 590, 40/591, 592, 601; 340/908.1, 472, 487, 468

(56) References Cited

U.S. PATENT DOCUMENTS

| | | | | |
|---|---|---|---|---|
| 3,761,890 A | * | 9/1973 | Fritts et al. | 40/592 |
| 4,152,854 A | * | 5/1979 | Berry, Jr. et al. | 40/610 |
| 4,259,660 A | * | 3/1981 | Oliver | 40/592 |
| 5,010,319 A | * | 4/1991 | Killinger | 40/592 |
| 5,433,026 A | * | 7/1995 | McDermott et al. | 40/592 |

FOREIGN PATENT DOCUMENTS

| | | | | |
|---|---|---|---|---|
| WO | WO 97/21873 | * | 6/1997 | E01F/9/012 |

* cited by examiner

*Primary Examiner*—Cassandra H. Davis
(74) *Attorney, Agent, or Firm*—Wallace G. Walter

(57) ABSTRACT

An elevatable multi-function signboard system for highway vehicles, such as pavement/roadway sweepers, carries a warning/signal system that can be moved between a lowered position and an elevated position. In the lowered position, the signboard also functions to cover and protect auxiliary equipment mounted at the rear of the vehicle. The signboard is mounted to the vehicle by a multiple bar linkage and raised and lowered by a hydraulic cylinder arrangement under the control of the vehicle operator. The multiple bar linkage allows the signboard to swing-out rearwardly of the vehicle as the signboard is raised to effectively uncover any auxiliary equipment carried on the sweeper.

15 Claims, 9 Drawing Sheets

FIG. 5
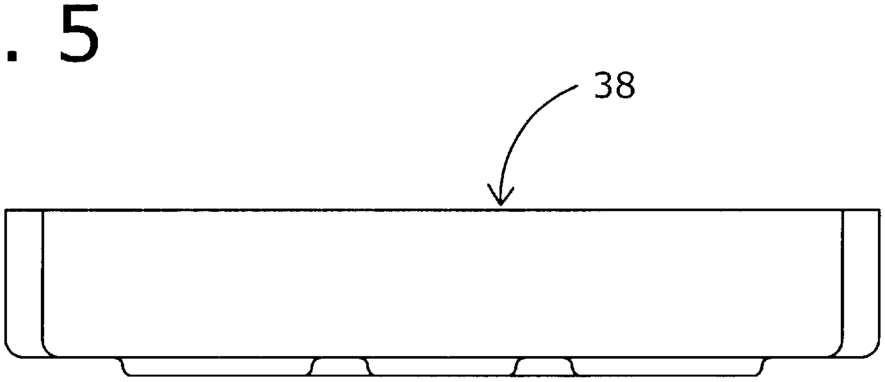
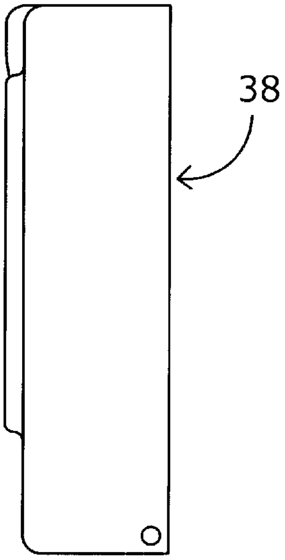
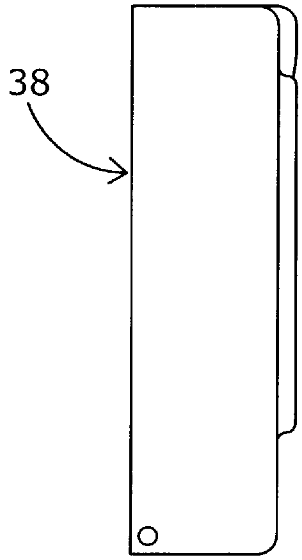
FIG. 6
FIG. 7

ELEVATABLE SIGNBOARD SYSTEM FOR HIGHWAY VEHICLES

BACKGROUND OF THE INVENTION

The present invention relates to an elevatable signboard for highway vehicles and, more particularly, to a multi-function signboard system that functions as both a signboard for warning approaching traffic and as a cover for auxiliary equipment carried by the vehicle.

Various types of industrial vehicles have been developed for use on highways, streets, and paved areas. In general, these vehicles include some type of rearward-directed illuminable warning/signal system to alert approaching traffic to the presence of the industrial vehicles in the roadway. Known warning/signalling systems have included flashing lights or beacons, strobe lights, and flashing or sequentially illuminated directional arrows. In general, the warning/signalling systems are "hard-mounted" to their vehicle, although it is known to mount the warning/signalling systems on a panel or board that can be elevated to increase visibility.

Some types of industrial vehicles, such as highway or roadway sweepers, carry accessory equipment at the rear end of the vehicles. In the case of roadway/pavement sweepers, an auxiliary vacuum intake hose is carried at the rear of the vehicle for use by the operator to vacuum debris from a specific location. In general, the vacuum intake hose is suspended from a boom or other crane-like structure that is pivotally mounted to the rear of the vehicle and also includes an intake snout that is manipulated by the operator to aspirate/vacuum debris from the ground surface. Typically, the vacuum intake hose and its related equipment are carried on brackets on the rear of the vehicle and are exposed to the elements.

From the standpoint of space utilization, the mounting of the warning/signal lamps on a separate panel adjacent to the rear-mounted auxiliary equipment is sub-optimal because of the space occupied by both sets of components.

SUMMARY OF THE INVENTION

In view of the above, it is an object of the present invention, among others, to provide an elevatable signboard for highway vehicles that carries the warning/signalling lamps used to warn on-coming vehicles of the highway vehicle.

It is another object of the present invention to provide an elevatable signboard for highway vehicles that functions to cover and protect any auxiliary equipment carried on the rear portion of the vehicle.

It is still another object of the present invention to provide an elevatable multi-function signboard system for highway vehicles that carries the warning/signalling lamps used to warn on-coming vehicles of the highway vehicle and also serves to cover and protect any auxiliary equipment carried on the rear portion of the vehicle.

In view of these objects, and others, the present invention provides a multi-function elevatable signboard system for highway vehicles that serves as a cap-like cover to protect auxiliary or accessory equipment mounted on the rear portion of the vehicle and also functions to warn on-coming traffic via warning/signal system associated with the signboard. In the preferred embodiment, the signboard is defined by a unitary molded structure that carries various lamps, strobes, reflectors, etc. The signboard is coupled to the rear of its vehicle by a series of adjustable links that allow the signboard a range of motion between a lowered or stowed position and a raised or deployed position. The pivoted adjustable links allow the signboard, as it is raised, to swing out from the rear of the vehicle and thus uncover any accessory or auxiliary equipment stowed at the rear of the vehicle. A pair of hydraulic cylinders are mounted between the vehicle and the signboard and are selectively operable to raise and lower the signboard to both increase the effective visibility of the signboard to on-coming traffic and uncover or otherwise make accessible any equipment stowed on the rear end of the vehicle and normally covered or protected by the signboard when the signboard is in its lowered position.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 5 is top view of the signboard of FIGS. 1–4;

FIG. 6 is a side view of the signboard;

FIG. 7 is a side view of the signboard from the side opposite of that shown in FIG. 4;

DESCRIPTION OF THE PREFERRED EMBODIMENT

Figure 1:
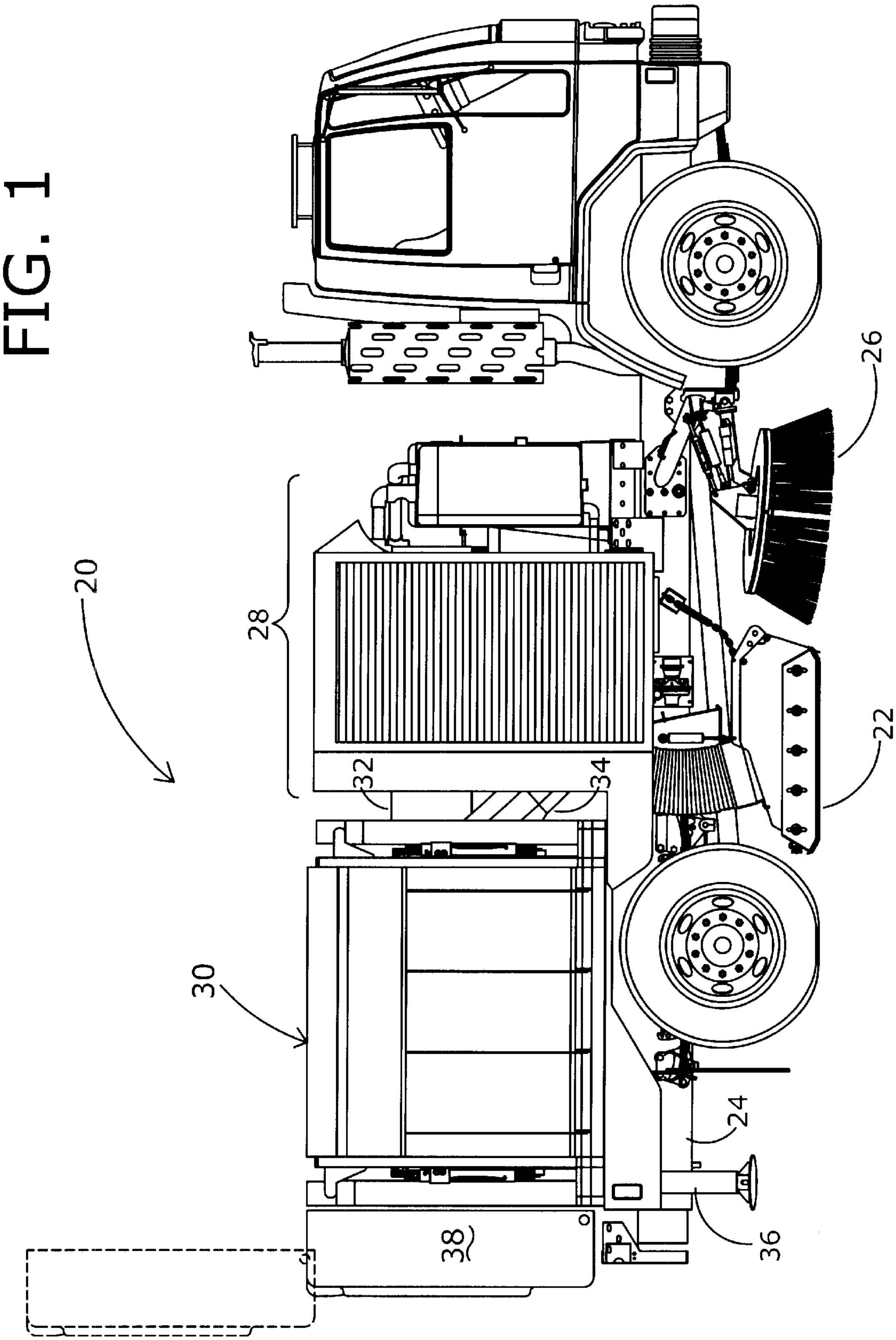
FIG. 1 is a side elevational view of an exemplary pavement/street sweeper having an elevatable signboard in accordance with the present invention showing the signboard in its lowered position (solid-line illustration) and in its raised position (dotted-line illustration)
Figure 2:
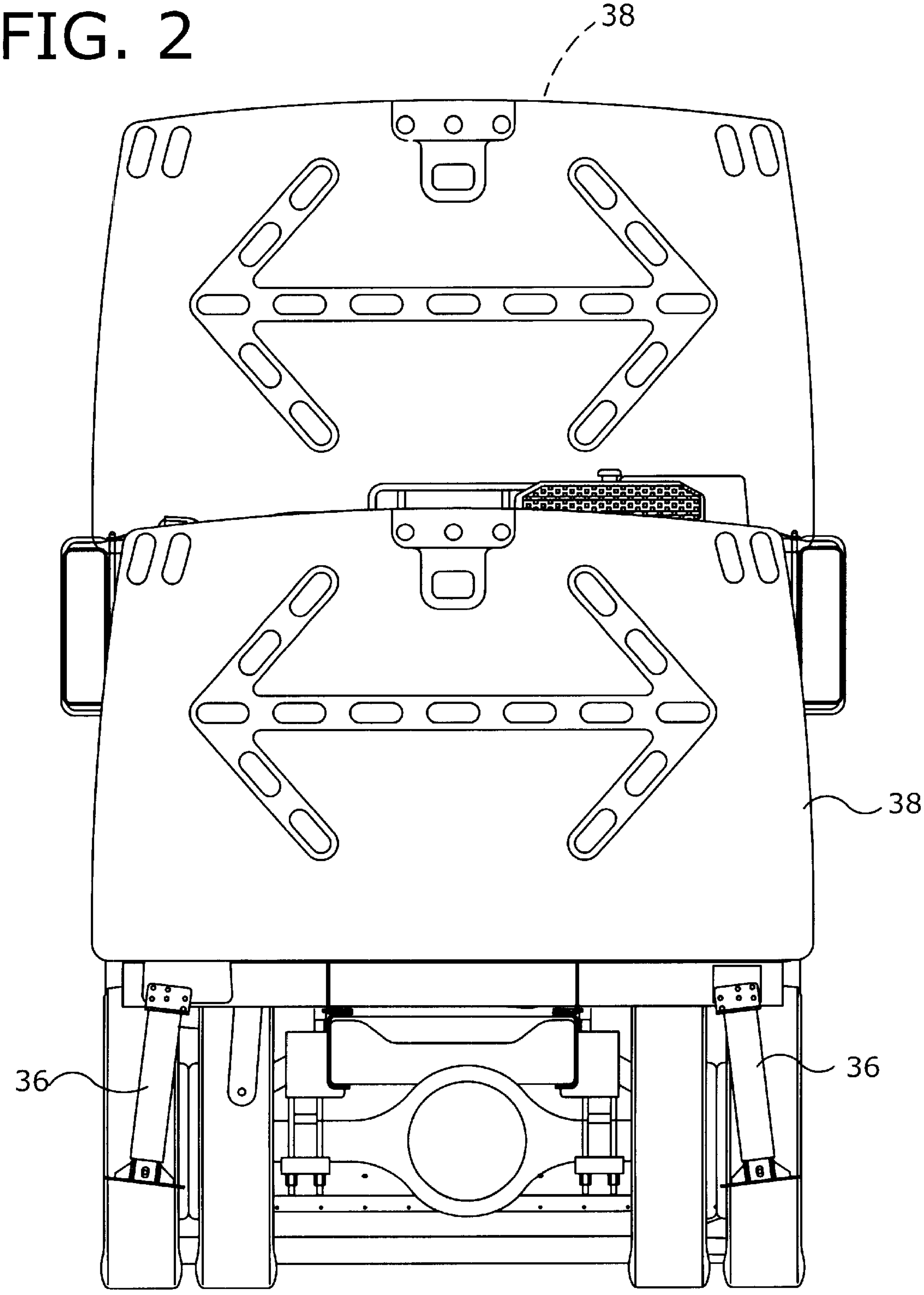
FIG. 2 is a rear view of the pavement/street sweeper of FIG. 1 showing the signboard in its lowered position (solid-line illustration) and in its raised position (dotted-line illustration)

A highway vehicle having an elevatable signboard in accordance with the present invention is shown in FIGS. 1 and 2 and designated generally therein by the reference character 20. The particular sweeper shown is representative of sweepers manufactured by Schwarze Industries, Inc. of Huntsville, Ala. 35811.

As shown in FIG. 1, the sweeper 20 is mounted on a commercial truck chassis and includes a debris intake hood 22 carried beneath the truck frame 24, a conventional gutter broom 26 that is mounted forwardly of the debris intake hood 22, a power unit 28 that includes (not specifically shown) a high-volume, high-velocity radial flow fan, an internal combustion engine for driving the fan and associated hydraulic pumps, and various accessory and related equipment as is known in the art. Various hydraulic hoses, pipes, valves, and related structures are not shown in the figures for reasons of clarity.

A debris container 30 is mounted rearwardly of the power unit 28 and is designed to receive and accumulate debris that is aspirated or swept from the roadway surface. The debris container 30 typically includes an inlet (not shown) into which the debris-laden air is conducted into the container and an outlet (not shown) through which the air flow is returned in an air flow recirculation loop as is known in the art. Air handling ducts, 32 and 34, interconnect the power unit 28 with the debris container 30 as is also known in the art. The debris-laden air, as it enters the internal volume of the debris container 30, experiences a decrease in its air velocity so that the entrained particles "drop-out" of the air flow and are collected in the debris container 30. The air flow within and through the debris container 30 can be directed through various baffles and/or screens to maximize the probability the debris will be collected in the debris container 30. The sweeper 20 also includes a pair of rear-mounted hydraulic stabilizer jacks 36 (best shown in FIG. 2) that can be extended to engage the ground surface to stabilize the sweeper 20 during its dump cycle.

A signboard 38 is provided at the rear end of the truck frame 24 and carries various operator-controllable warning lights, reflectors, and an illuminable bi-directional arrow, as explained more fully below. The signboard 38 is movable between a lowered position (solid-line position in FIGS. 1 an 2) and a raised or elevated position (dotted-line illustration).

Figure 3:
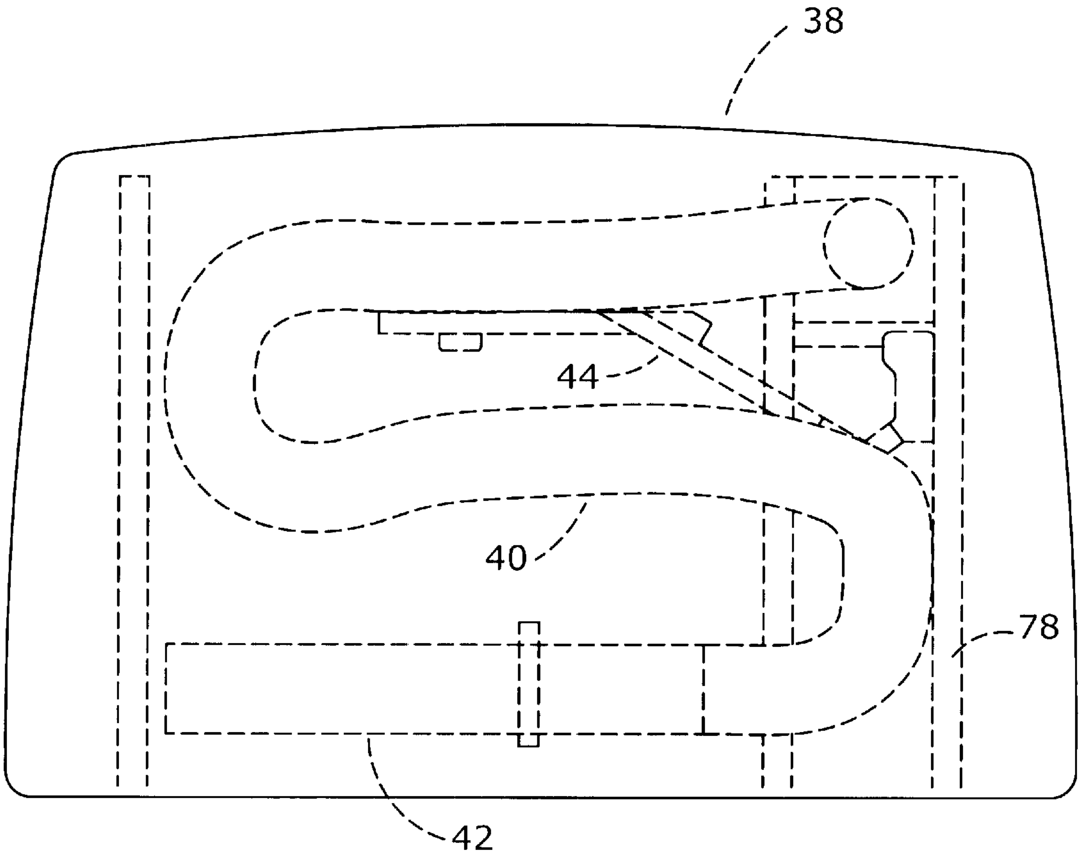
FIG. 3 is an elevational view of the outline of signboard showing (in dotted-line illustration) an exemplary auxiliary vacuum hose and swing-out boom or crane that are both covered and protected by the signboard when the signboard is in its lowered position.
Figure 4:
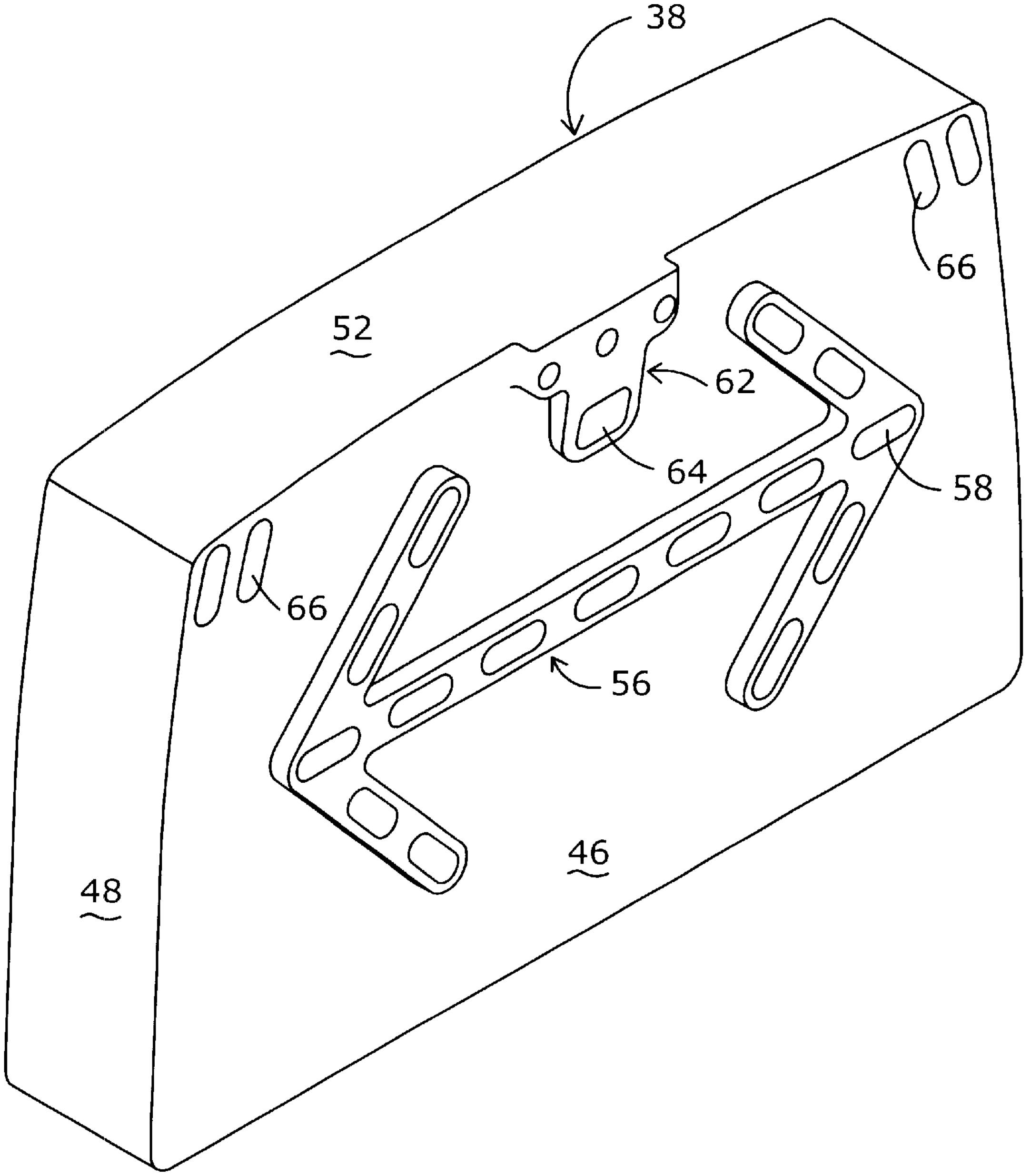
FIG. 4 is a front perspective view of the signboard.

It is common to mount various types of auxiliary and/or accessory equipment on the rear portion of the sweeper 20. As shown in dotted-line illustration in FIG. 3, one common accessory is a flexible vacuum hose 40 (typically in the six to ten-inch diameter range) that includes an intake or pick-up snout 42 that can be used by an operator to vacuum or aspirate debris at the rear of the sweeper. In addition to the accessory vacuum hose 40, other equipment can include a pivotally mounted boom or crane 44 from which the vacuum hose 40 is suspended, a below-described upright that supports the crane 44, and various brackets that carry the vacuum hose 40 in a stowed configuration, and the like. Other auxiliary equipment can include, for example, highway traffic cones, shovels, brooms, etc.

Figure 8:
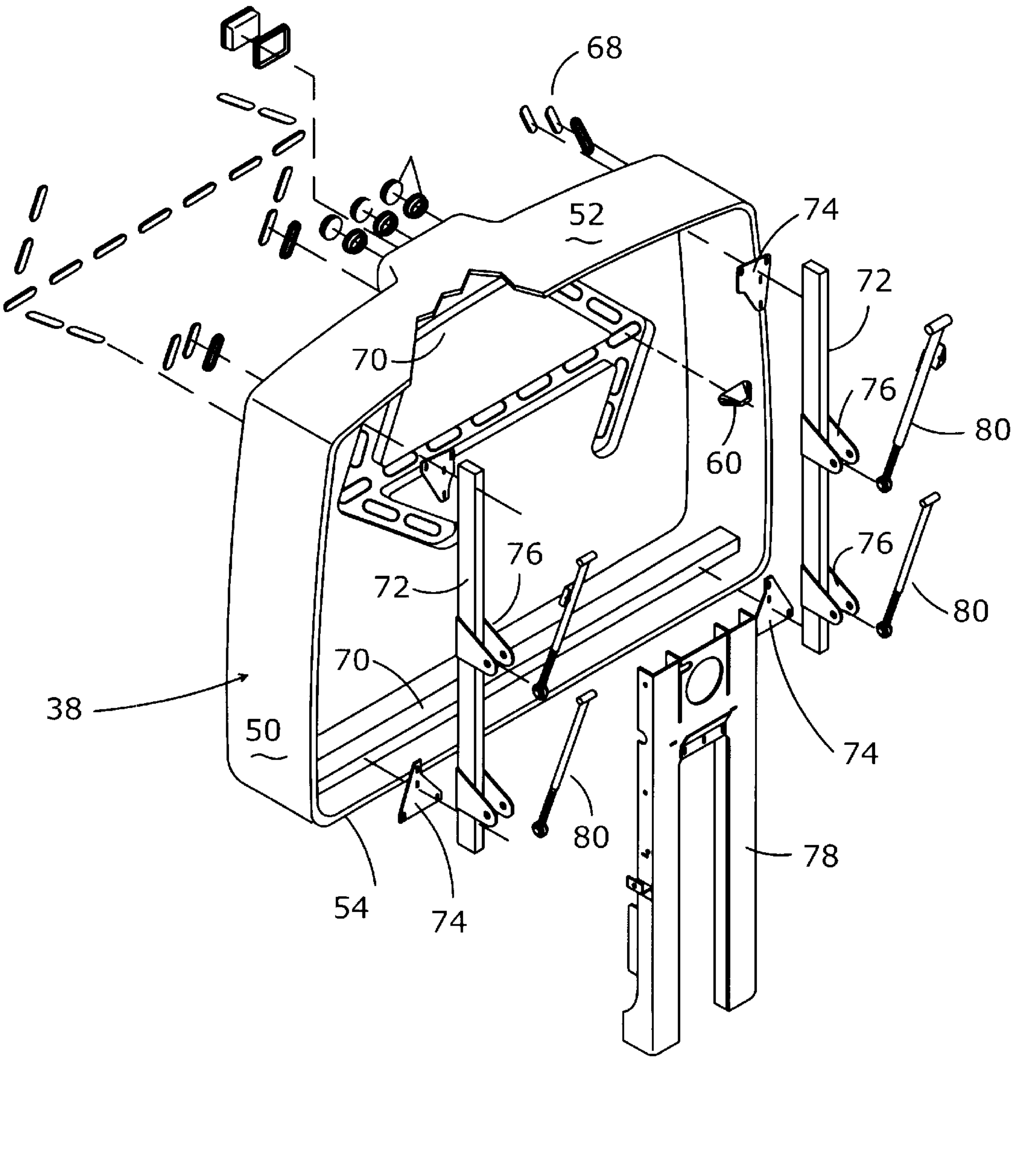
FIG. 8 presents the basic structural members of the signboard in an exploded isometric view.

As shown in the front perspective view of FIG. 4, FIGS. 5–7, and the rear perspective view of FIG. 8, the signboard 38 is fabricated as a molded shell, preferably from a fiber-reinforced plastic or similar material. The signboard 38 can be fabricated by forming the material on the interior of a wooden mold that has been prepared with a mold-release compound, as is conventional.

The signboard 38 includes a principal or primary rear-facing panel 46, side panels 48 and 50, a top panel 52, and a bottom panel 54. A bi-directional arrow 56 is formed by a raised embossment on the rear-facing panel 46; the bi-directional arrow 56 also includes a series of openings 58. As represented by the lamp assembly 60 in FIG. 8, the openings 58 are designed to receive illuminable electrically powered devices, such as halogen lamps or light-emitting diode assemblies. Another raised embossment 62 is formed on the upper mid-portion of the rear-facing panel 46 and similarly carries an opening 64 for a illuminable lamp or similar device. Additionally, the rear-facing panel 46 also includes various sites 66 for reflectors 68. The arrangement of the reflectors and lights is representative of various lighting/reflector configurations.

As best seen in FIG. 8, the rear-facing panel 46, side panels 48 and 50, the top panel 52, and the bottom panel 54 define an open, forward-facing box-like form. The volume defined between these various panels is occupied by the auxiliary equipment when the signboard 38 is in its lowered position (i.e., FIG. 3). The signboard 38 includes laterally extending cross-members 70 to which a pair of vertically aligned spaced-apart stiles 72 are secured via mounting plates 74. Each stile 72 also includes a pair of vertically spaced attachment brackets 76. A support upright 78 is secured to the truck frame (not shown in FIG. 8) and can be fabricated, for example, as a steel pressing or stamping or as a weldment. As shown in dotted-line illustration in FIG. 3 and in FIG. 8, the upright 78 is attached to the truck frame 24 and serves as a support from the pivoted boom or crane 44 that supports the vacuum hose 40. A set of four adjustable links 80 are pivotally connected between respective attachment brackets 76 on the stiles 72 and attachment points (unnumbered) on the upright 78 and another support (shown in dotted-line illustration on the left in FIG. 3). The adjustable links 80 are defined by two lineally extending portions that are in threaded engagement so that their respective lengths can be increase or decreased.

Figure 9:
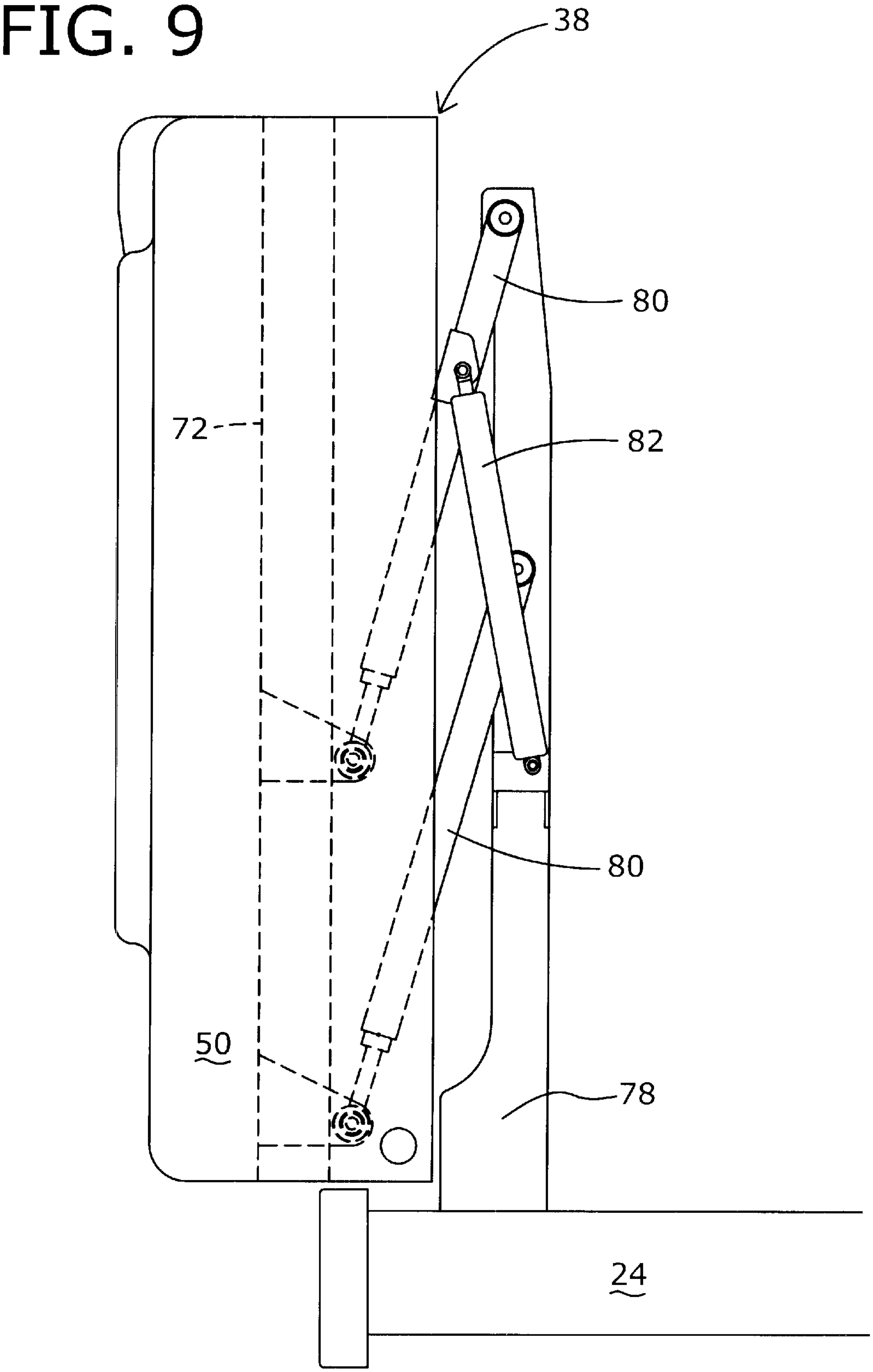
FIG. 9 is a side view of the signboard and its related support links in its lowered position.
Figure 10:
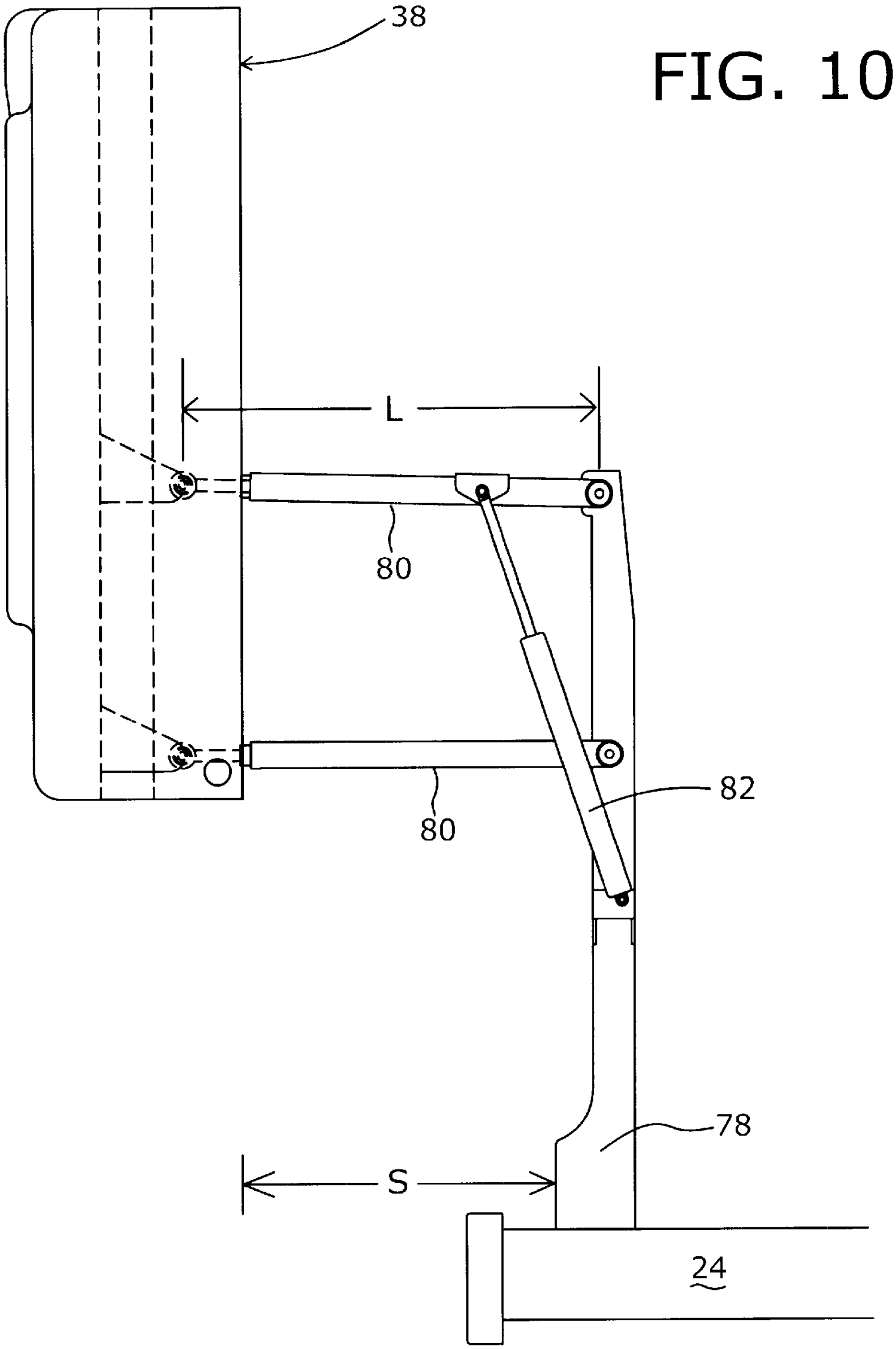
FIG. 10 is a side view of the signboard and its related support links in its mid-position.
Figure 11:
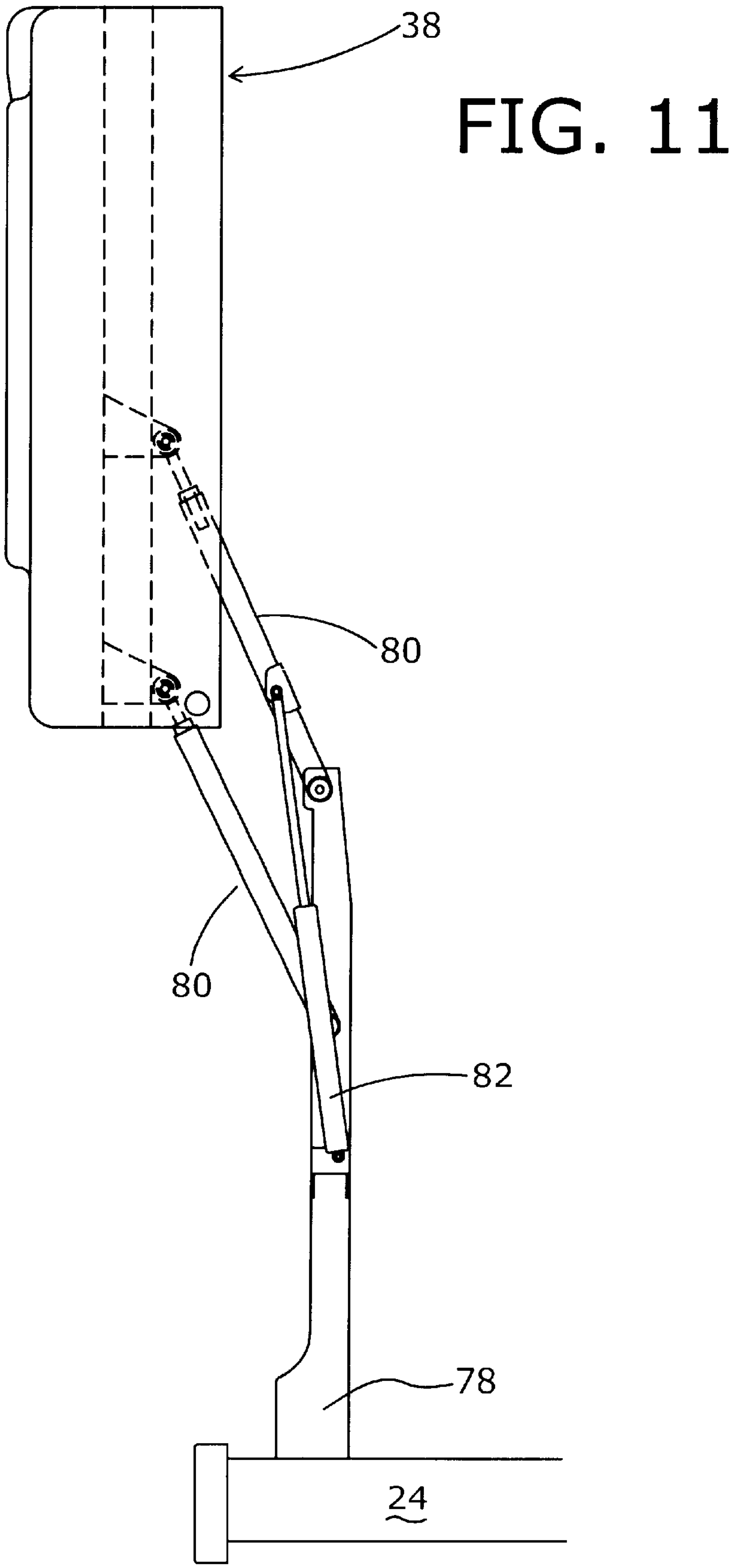
FIG. 11 is a side view of the signboard and its related support links in its elevated position.

The signboard 38 is raised and lowered by hydraulic cylinders connected between each upper link and the upright 78. As represented in FIGS. 9–11, a hydraulic cylinder 82 is connected between each upright 78 and the corresponding upper adjustable link 80. The hydraulic cylinder 82 can be pressurized by an operator to raise and lower the signboard 38.

As shown in FIG. 9, the signboard 38 is normally maintained in its lowered or stowed position. It is in this lowered position that the signboard 38 covers any auxiliary equipment mounted at the rear of the sweeper, such as the auxiliary hose 40 of FIG. 3 and related accessories for manual vacuuming of debris from the roadway by the vehicle operator. In general, the auxiliary hose will be supported by brackets secured to the upright 78. As the hydraulic cylinder 82 is pressurized, the signboard 38 is lifted and swung rearwardly from its lowered, stowed position upwardly through a mid-position (FIG. 10) and then to its raised or deployed position as shown in FIG. 11. When the signboard 38 is in its raised position, the effective range of the warning/signalling lamps is greatly increased. Additionally, the auxiliary equipment at the rear of the vehicle is then available for deployment/use by the operator. While not specifically shown, the debris container 30 can include an access door or hatch that can be opened by the operator and into which large pieces of debris can be placed.

As shown in FIG. 10, the use of pivoted links 80 having an average length of "L" confers a swing-out characteristic to the signboard 38 as it is deployed by which the signboard 38 will swing rearwardly some distance "S" as it is raised. Thus, auxiliary equipment, such as the vacuum hose 40, can be effectively covered or 'capped' within the internal space or volume of the signboard defined between the rear-facing panel 46, the side panels 48 and 50, the top panel 52, and the bottom panel 54. The swing-out characteristic allows the signboard 38 to move rearwardly of the auxiliary equipment as it is also raised, and, conversely, move in forward direction to 'cap' and protect the auxiliary equipment as the signboard 38 is lowered to its stowed position (FIG. 9).

The present invention advantageously provides an elevatable multi-function signboard for highway vehicles in which the signboard functions to both cover and protect auxiliary equipment mounted and the rear of the vehicle and can be raised to a lifted or deployed position by which its effective range can be greatly increased As will be apparent to those skilled in the art, various changes and modifications may be made to the illustrated elevatable signboard for highway vehicles of the present invention without departing from the spirit and scope of the invention as determined in the appended claims and their legal equivalent.

What is claimed is:

1. An signboard for highway vehicles comprising:

a signboard having a rear-facing primary panel, a top panel, and at least two side panels to define a volume in a space therebetween, said primary panel having at least one illuminatable light source thereon;

a mounting structure attached to a rear portion of a highway vehicle; and a plurality of links pivotally attached at one end to said mounting structure and pivotally attached at their respective other ends to said signboard constraining said signboard to a range of motion from a lowered to a raised portion wherein said signboard swings-out rearwardly of said rear portion of the highway vehicle as it is moved to and from its lowered position and its raised position and is substantially maintained in its rear-facing attribute as it is moved to and from its lowered position.

2. The signboard for highway vehicles of claim 1, further comprising means for moving said signboard from the lowered position to the raised position.

3. The signboard for highway vehicles of claim 1, further comprising at least one fluid actuated-cylinder for moving said signboard from the lowered position to the raised position.

4. The signboard for highway vehicles of claim 1, further comprising a plurality of said light sources defining an illuminatable directional arrow on said primary panel.

5. The signboard for highway vehicles of claim 1, wherein the length of at least one of said links is individually adjustable.

6. An signboard for highway vehicles having auxiliary equipment mounted on a rear portion of the vehicle, comprising:

a signboard having a rear-facing primary panel, a top panel, and at least two side panels to define a volume therebetween, said primary panel having at least one illuminatable light source thereon;

a mounting structure attached to the rear portion of a highway vehicle; and a plurality of links pivotally attached at one end to said mounting structure and pivotally attached at their respective other ends to said signboard to constrain said signboard to a range of motion from a lowered to a raised portion wherein said signboard swings-out rearwardly of said rear portion of the highway vehicle and substantially maintains its rear-facing attribute as it is moved to and from its lowered position;

said signboard, when in its lowered position, covering any auxiliary equipment mounted at the rear portion of said vehicle and uncovering the auxiliary equipment when in its raised position.

7. The signboard for highway vehicles of claim 6, wherein the length of at least one of said links is individually adjustable.

8. The signboard for highway vehicles of claim 6, further comprising means for moving said signboard from the lowered position to the raised position.

9. The signboard for highway vehicles of claim 6, further comprising at least one fluid actuated cylinder for moving said signboard from the lowered position to the raised position.

10. The signboard for highway vehicles of claim 6, further comprising a plurality of said light sources defining an illuminatable directional arrow on said primary panel.

11. A multi-function signboard system for a pavement/roadway sweeping vehicle having auxiliary equipment mounted on a rear potion of the vehicle including a vacuum hose for vacuuming debris from a roadway/pavement surface, comprising:

a signboard having a rear-facing primary panel, a top panel, and at least two side panels to define a volume therebetween, said primary panel having at least one rear-facing illuminatable light source thereon;

a mounting structure attached to the rear portion of a highway vehicle; and a plurality of links pivotally attached at one end to said mounting structure and pivotally attached at their respective other ends to said signboard to constrain said signboard to a range of motion from a lowered to a raised portion wherein said signboard swings-out rearwardly of said rear portion of the pavement/roadwaysweeping vehicle and is substantially maintained in its rear-facing attribute as it is moved to and from its lowered position;

said signboard, when in its lowered position, covering any auxiliary equipment, including a vacuum hose, mounted at the rear portion of the vehicle and uncovering the auxiliary equipment when in its raised position.

12. The signboard for highway vehicles of claim 11, wherein the length of at least one of said links is individually adjustable.

13. The signboard for highway vehicles of claim 11, further comprising means for moving said signboard from the lowered position to the raised position.

14. The signboard for highway vehicles of claim 11, further comprising at least one fluid actuated cylinder for moving said signboard from the lowered position to the raised position.

15. The signboard for highway vehicles of claim 11, further comprising a plurality of said light sources defining an illuminatable directional arrow on said primary panel.

* * * * *